E. Stebbins.
Stop Cock.
Nº 23,721.      Patented Apr. 19, 1859.
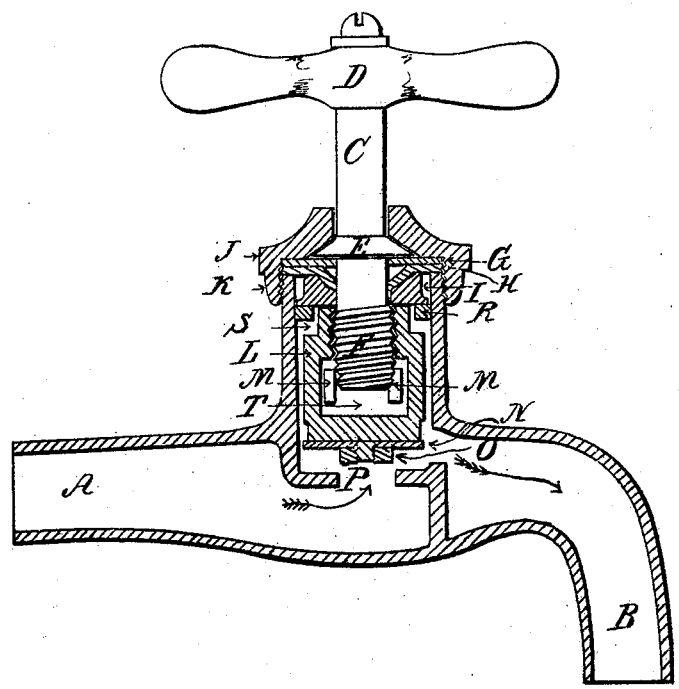
Witnesses,
Edward W. Bliss
Jenny W. Bliss
Inventor,
Erastus Stebbins

UNITED STATES PATENT OFFICE.

ERASTUS STEBBINS, OF CHICOPEE, MASSACHUSETTS.

STOP-COCK.

Specification forming part of Letters Patent No. 23,721, dated April 19, 1859; Reissued December 20, 1859, No. 868.

*To all whom it may concern:*

Be it known that I, ERASTUS STEBBENS, of Chicopee, county of Hampden, and State of Massachusetts, have invented certain new and useful Improvements in Cocks for Fluids; and I do hereby declare that the same is described and represented in the following specification and drawings, and to enable others skilled in the art to make and use the same I will proceed to describe the construction and operation, referring to the drawings, in which the same letters indicate like parts in each of the figures.

The nature, design and object of this improvement may be understood from the following.

The drawing shows a central sectional view of my improved cock for fluids.

A, represents the induction tube made tapering, so that it may be driven into wood, soldered to tubing, or having a screw cut thereon for the purpose of securing it into wood &c., wherever it may be desirable to use it.

B is the eduction tube.

C, shows the screw spindle in full, with a thumb piece D, upon the outer end.

J, is a cap through which the spindle C passes which closes the upper orifice, having a conical or concave shaped recess corresponding to the shape of the collar E, and having a screw by which the cap is secured, and its seat made tight by the flexible washer H, which lays in the joint thereof.

P, is the valve seat and opening.

R, is a seat, or projection for the collar I.

S, is the valve chamber.

The metallic washer G, elastic washer H, and metallic conical, or concave shape collar I, constitute one of the peculiar features of this improvement.

L is the screw nut. The manner of its construction, so as to perfect and facilitate in making them constitute another desirable achievement in their manufacture.

T, is the chamber of the nut.

M, are openings through the shell of the nut, and is raised and depressed thereby, to and from the seat P.

N, is an elastic substance, or washer secured to the end of the nut L by a screw or nut O.

Now it will be seen that by the combined use of the washer G, and the conical or concave collar I, I am enabled to introduce the flexible washer H, which by cutting the central hole for the spindle, smaller than the spindle itself and placing it upon the spindle C between the washer G and collar I, compresses and makes tight the joint, and allows the spindle to work perfectly free, and is found thereby, effectually to keep the joint tight a greater length of time than those now in use. It is thought it may be desirable some times to add a small washer or wind packing to fill the vacant space produced by the concave collar I. Also in regard to the nut L quite an advantage is derived in the manufacture by having the chamber T and apertures M. There is not so much loss in bad castings, all are more perfect, quite a saving of metal, more easily fitted up and is more perfectly lubricated.

What I claim and desire to secure by Letters Patent is—

1. The arrangement and combination of the collar I, flexible washer H, metallic washer G, as and for the purpose described.

2. Also the chambered nut, or valve L having apertures M, as and for the purpose described.

ERASTUS STEBBINS.

Witnesses:
EDWARD M. BLISS,
JEREMY W. BLISS.